United States Patent
Busick et al.

(10) Patent No.: US 11,855,905 B2
(45) Date of Patent: Dec. 26, 2023

(54) SHARED STORAGE MODEL FOR HIGH AVAILABILITY WITHIN CLOUD ENVIRONMENTS

(71) Applicant: NetApp Inc., San Jose, CA (US)

(72) Inventors: Christopher Busick, Shrewsbury, MA (US); Rajesh Rajaraman, Acton, MA (US); James Silva, Bedford, MA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/071,778

(22) Filed: Nov. 30, 2022

(65) Prior Publication Data

US 2023/0087493 A1 Mar. 23, 2023

Related U.S. Application Data

(63) Continuation of application No. 16/658,648, filed on Oct. 21, 2019, now Pat. No. 11,522,808.

(Continued)

(51) Int. Cl.
*G06F 15/16* (2006.01)
*H04L 47/74* (2022.01)
(Continued)

(52) U.S. Cl.
CPC ........ *H04L 47/746* (2013.01); *G06F 9/45558* (2013.01); *G06F 11/0757* (2013.01); *G06F 13/4221* (2013.01); *G06F 16/1774* (2019.01); *G06F 16/1824* (2019.01); *H04L 41/0668* (2013.01); *H04L 45/28* (2013.01);
(Continued)

(58) Field of Classification Search
CPC ................. H04L 47/746; H04L 47/125; G06F 2009/4557
See application file for complete search history.

(56) References Cited

U.S. PATENT DOCUMENTS 7,330,862 B1 * 2/2008 Srinivasan .............. G06F 16/10
7,386,546 B1 * 6/2008 Santry ..................... G06F 16/10
707/999.005

(Continued)

OTHER PUBLICATIONS

A Tutorial on SCSI-3 Persistent Group Reservations, Dec. 2012, SUSE Labs, Version 1.1, Retrieved from :URL: https://www.gonzoleeman.net/documents/scsi-3-pgr-tutorial-v11.pdf, 11 pages.

(Continued)

*Primary Examiner* — Hieu T Hoang
(74) *Attorney, Agent, or Firm* — COOPER LEGAL GROUP, LLC

(57) ABSTRACT

Techniques are provided for a high availability solution (e.g., a network attached storage (NAS) solution) with address preservation during switchover. A first virtual machine is deployed into a first domain and a second virtual machine is deployed into a second domain of a computing environment. The first and second virtual machines are configured as a node pair for providing clients with access to data stored within an aggregate comprising one or more storage structures within shared storage of the computing environment. A load balancer is utilized to manage logical interfaces used by clients to access the virtual machines. During switchover, the load balancer preserves an IP address used to mount and access a data share of the aggregate used by a client.

23 Claims, 8 Drawing Sheets

Related U.S. Application Data

(60) Provisional application No. 62/748,409, filed on Oct. 20, 2018.

(51) Int. Cl.

| | |
|---|---|
| *H04L 47/125* | (2022.01) |
| *H04L 45/00* | (2022.01) |
| *H04L 47/785* | (2022.01) |
| *H04L 45/28* | (2022.01) |
| *H04L 47/10* | (2022.01) |
| *G06F 16/182* | (2019.01) |
| *G06F 16/176* | (2019.01) |
| *G06F 11/07* | (2006.01) |
| *H04L 67/1097* | (2022.01) |
| *G06F 9/455* | (2018.01) |
| *G06F 13/42* | (2006.01) |
| *H04L 41/0668* | (2022.01) |

(52) U.S. Cl.
CPC ............ *H04L 45/34* (2013.01); *H04L 47/125* (2013.01); *H04L 47/29* (2013.01); *H04L 47/786* (2013.01); *H04L 67/1097* (2013.01); *G06F 2009/4557* (2013.01); *G06F 2213/0036* (2013.01)

(56) References Cited

U.S. PATENT DOCUMENTS

| | | | |
|---|---|---|---|
| 7,739,546 B1* | 6/2010 | Rodrigues | G06F 11/1662 714/13 |
| 7,865,663 B1* | 1/2011 | Nelson | G06F 13/42 718/1 |
| 8,135,930 B1* | 3/2012 | Mattox | G06F 3/0617 711/100 |
| 8,621,461 B1* | 12/2013 | Chandrachari | G06F 9/45545 718/1 |
| 8,806,266 B1* | 8/2014 | Qu | G06F 11/1438 714/4.11 |
| 9,841,988 B1* | 12/2017 | Magnezi | H04L 67/34 |
| 9,984,140 B1 | 5/2018 | Sukumaran et al. | |
| 10,623,319 B1 | 4/2020 | Talnikov et al. | |
| 11,128,573 B2 | 9/2021 | Busick et al. | |
| 11,146,564 B1 | 10/2021 | Ankam et al. | |
| 11,316,822 B1* | 4/2022 | Gawade | H04L 61/5084 |
| 11,522,808 B2 | 12/2022 | Busick et al. | |
| 2002/0199113 A1 | 12/2002 | Pfister et al. | |
| 2003/0065782 A1 | 4/2003 | Nishanov et al. | |
| 2003/0158933 A1* | 8/2003 | Smith | H04L 1/22 709/224 |
| 2003/0200398 A1 | 10/2003 | Harris | |
| 2003/0217241 A1 | 11/2003 | Chong, Jr. et al. | |
| 2004/0233910 A1 | 11/2004 | Chen et al. | |
| 2006/0259641 A1 | 11/2006 | Kim et al. | |
| 2008/0028145 A1* | 1/2008 | Lecomte | G06F 3/0664 711/114 |
| 2009/0007135 A1* | 1/2009 | Rathunde | G06F 8/65 718/107 |
| 2010/0088698 A1* | 4/2010 | Krishnamurthy | H04L 63/10 718/1 |
| 2010/0287416 A1 | 11/2010 | Shacham et al. | |
| 2013/0346573 A1* | 12/2013 | Hemachandran | G06F 9/5072 709/223 |
| 2014/0143401 A1* | 5/2014 | Carlen | G06F 11/2043 709/223 |
| 2014/0229606 A1* | 8/2014 | Griswold | H04L 41/069 709/224 |
| 2014/0359612 A1* | 12/2014 | D'Amato | H04L 67/1097 718/1 |
| 2014/0359698 A1 | 12/2014 | Sorenson, III et al. | |
| 2015/0309892 A1* | 10/2015 | Ramasubramaniam | G06F 11/3027 714/4.5 |
| 2015/0312337 A1* | 10/2015 | Keremane | G06F 3/067 709/217 |
| 2015/0372935 A1* | 12/2015 | Åkervik | H04L 67/1097 709/226 |
| 2016/0055018 A1* | 2/2016 | Usgaonkar | G06F 9/4401 718/1 |
| 2016/0127307 A1* | 5/2016 | Jain | G06F 16/148 709/245 |
| 2016/0139943 A1* | 5/2016 | Bezbaruah | G06F 3/065 718/1 |
| 2016/0173517 A1* | 6/2016 | Diaz | H04L 61/5084 726/12 |
| 2017/0060705 A1* | 3/2017 | Sridhara | G06F 11/1662 |
| 2017/0109184 A1* | 4/2017 | Ramani | H04N 21/6408 |
| 2017/0249082 A1 | 8/2017 | Litke et al. | |
| 2017/0272523 A1* | 9/2017 | Cillis | H04L 41/40 |
| 2017/0322851 A1* | 11/2017 | Brown | G06F 11/1451 |
| 2017/0346686 A1* | 11/2017 | Mudigonda | H04L 41/0813 |
| 2018/0034769 A1* | 2/2018 | Modi | H04L 47/125 |
| 2018/0063231 A1 | 3/2018 | Park | |
| 2018/0063233 A1 | 3/2018 | Park | |
| 2018/0232395 A1* | 8/2018 | Deshmukh | G06F 3/0643 |
| 2018/0255463 A1* | 9/2018 | Zheng | G06F 9/45558 |
| 2018/0260261 A1* | 9/2018 | Mohammed | G06F 9/5077 |
| 2019/0007206 A1* | 1/2019 | Surla | H04L 63/10 |
| 2019/0102455 A1* | 4/2019 | Radhakrishnan | G06F 40/284 |
| 2019/0278524 A1* | 9/2019 | Dev | G06F 9/45558 |
| 2019/0306231 A1 | 10/2019 | Shimoga Manjunatha et al. | |
| 2019/0311049 A1* | 10/2019 | Bhargava M R | G06F 16/152 |
| 2020/0034191 A1* | 1/2020 | Tarasuk-Levin | G06F 9/45558 |
| 2020/0036638 A1 | 1/2020 | Li et al. | |
| 2020/0125386 A1* | 4/2020 | Busick | H04L 41/5096 |
| 2020/0125537 A1 | 4/2020 | Busick et al. | |
| 2021/0044523 A1 | 2/2021 | Kawatani | |
| 2022/0006755 A1 | 1/2022 | Busick et al. | |

OTHER PUBLICATIONS

Anonymous, "A Method for Load Balancer Cluster as a Service in Openstack Cloud System," Sep. 19, 2016, IP.com Prior Art Database Technical Disclosure, retrieved from URL: [https://ip.com/IPCOM/000247596], pp. 1-9.

Branden R., et al., "Resource ReSerVation Protocol (RSVP)—Version 1 Functional Specification," RFC 2205, 1997, Network Working Group, 110 pages. Retrieved from the Internet: URL: https://datatracker.ietf.org/doc/html/rfc2205.

Final Office Action dated May 19, 2022 for U.S. Appl. No. 16/658,302, filed Oct. 21, 2019, 32 pages.

Non-Final Office Action dated Dec. 7, 2021 for U.S. Appl. No. 16/658,302, filed Oct. 21, 2019, 28 pages.

Non-Final Office Action dated May 2, 2022 for U.S. Appl. No. 16/658,648, filed Oct. 21, 2019, 13 pages.

Non-Final Office Action dated Sep. 28, 2022 for U.S. Appl. No. 16/658,302, filed Oct. 21, 2019, 37 pages.

Notice of Allowance dated Aug. 3, 2022 for U.S. Appl. No. 16/658,648, filed Oct. 21, 2019, 8 pages.

Notice of Allowance dated Jun. 23, 2023 for U.S. Appl. No. 16/658,302, filed Oct. 21, 2019, 2 pages.

Notice of Allowance dated Mar. 10, 2023 for U.S. Appl. No. 16/658,302, filed Oct. 21, 2019, 8 pages.

Notice of Allowance dated May 21, 2021 for U.S. Appl. No. 16/658,280, filed Oct. 21. 2019, 9 pages.

* cited by examiner

SHARED STORAGE MODEL FOR HIGH AVAILABILITY WITHIN CLOUD ENVIRONMENTS

RELATED APPLICATIONS

This application claims priority to and is a continuation of U.S. application Ser. No. 16/658,648, filed on Oct. 21, 2019, now allowed, titled "SHARED STORAGE MODEL FOR HIGH AVAILABILITY WITHIN CLOUD ENVIRONMENTS," which claims priority to U.S. Provisional Patent Application, titled "HIGH AVAILABILITY FOR CLOUD, SHARED STORAGE WITH LOCKING, AND IP FAILOVER USING NETWORK LOAD BALANCER", filed on Oct. 20, 2018 and accorded U.S. Application No. 62/748,409, which are incorporated herein by reference.

BACKGROUND

A computing environment, such a cloud computing environment, can be used to host virtual machines that provide services to client devices that connect to the computing environment over a network. In an example, a first virtual machine and a second virtual machine may be configured as high availability partners (a node pair) that are hosted by the cloud computing environment. The first virtual machine and the second virtual machine may be maintained by a storage service provider so that the first virtual machine and the second virtual machine can provide storage services to clients of the storage service provider. The first virtual machine and the second virtual machine may store data within an aggregate comprising one or more storage structures (e.g., a page blob, a public cloud disk, an object etc.) stored within shared storage of the cloud computing environment.

If the first virtual machine that is actively servicing requests encounters a failure, then the storage service provider would want the ability to switchover (failover) to the second virtual machine that can then service requests that would otherwise be directed to the failed first virtual machine and fails. Switching over from the failed first virtual machine to the second virtual machine may result in a change of an address used by a client to mount and access a data share of the aggregate (e.g., a change from an IP address of the first virtual machine to an IP address of the second virtual machine). This change in the address can cause client disruption because the client would have to become aware of the new address (e.g., the IP address of the second virtual machine) to subsequently use for accessing data within the aggregate. Furthermore, switching over from the failed first virtual machine to the second virtual machine may involve moving a network interface corresponding to the address of the first virtual machine to the second virtual machine. Unfortunately, this can take minutes to perform, resulting in client data access disruption, application timeouts for applications relying on access to the data, and client data loss. Thus, current failover capabilities of virtual machines (nodes) hosted with these computing environments will violate recovery time objectives (RTOs) and recovery point objectives (RPOs).

DETAILED DESCRIPTION

Figure 1:
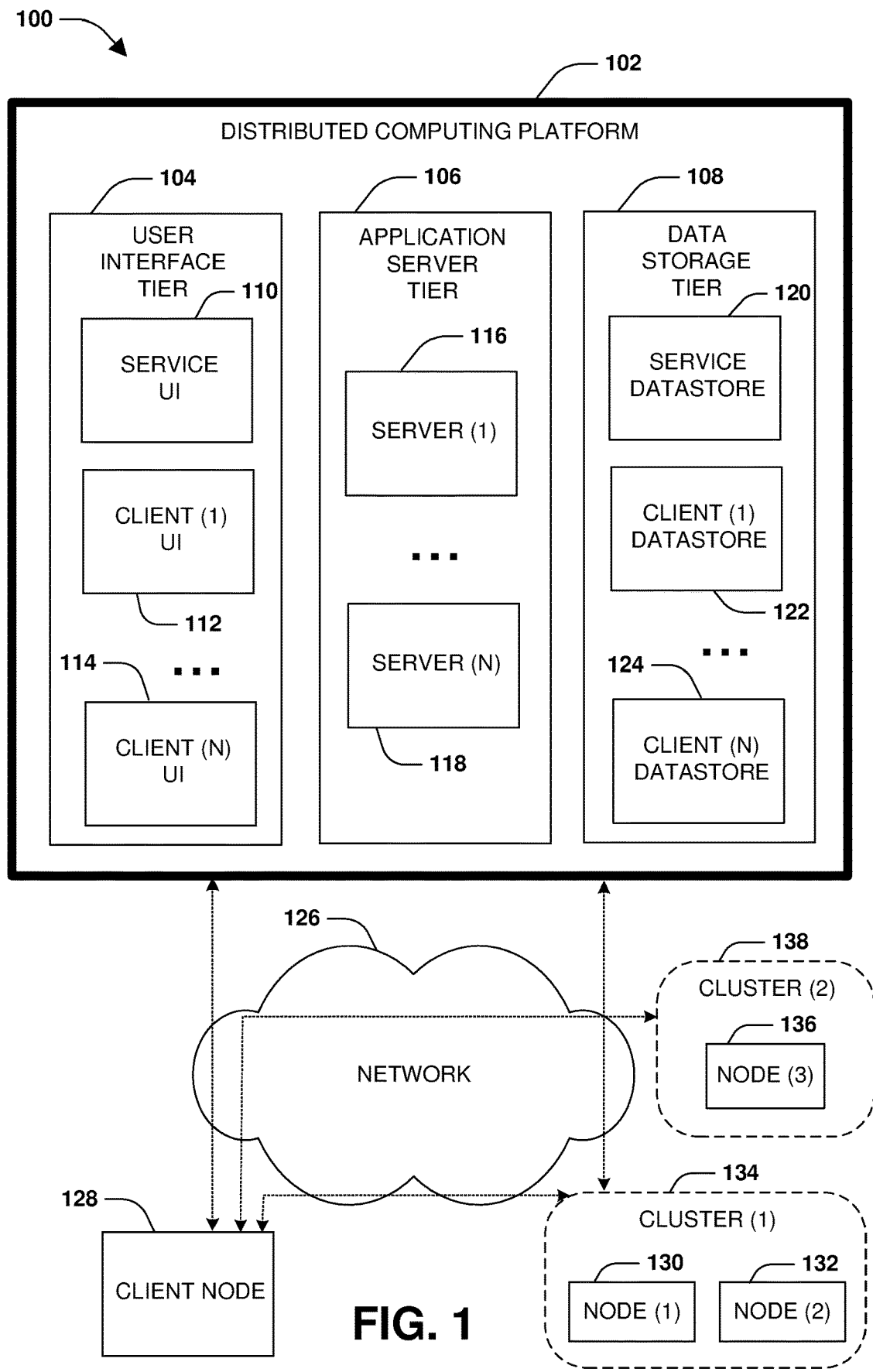
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Storage services (e.g., a data storage appliance) may be deployed as virtual machines (nodes) within a computing environment such as a cloud computing environment. A primary virtual machine may be deployed within the cloud computing environment to provide client devices with primary access to data stored by the primary virtual machine within shared storage (e.g., a public cloud disk, a page blob, etc.). The primary virtual machine may provide services to applications, executing within the cloud computing environment, which use traditional protocols such as a Network File System (NFS) protocol, a Common Internet File System (CIFS) protocol, and an Internet Small Computer Systems Interface (iSCSI) that are different than a protocol utilized by the cloud computing environment such as a representational state transfer (REST) protocol where HTTP requests can be used to access storage structures such as page blobs within the shared storage. The primary virtual machine may use block storage devices as virtual machine disks within which data is stored.

A storage service provider that deploys the virtual machines into the cloud computing environment may want to provide continuous data availability against software and hardware failures for clients storing data or executing applications associated with the primary virtual machine. Thus, the storage service provider may deploy a secondary virtual machine into the cloud computing environment. If the primary virtual machine fails, then the secondary virtual machine can perform a switchover to provide the client devices and applications with access to data that was previously accessible through the primary virtual machine. Unfortunately, switchover can result in a change in an IP address used by a client to mount a data share of an aggregate provided to the client by the primary virtual machine. For example, the IP address may change from an IP address of the primary virtual machine to an IP address of the secondary virtual machine. This can cause client disruption and downtime, which can violate recovery time objectives (RTOs) and recovery point objectives (RPOs). Furthermore, switchover may involve moving a network interface (e.g., the IP address) from the primary virtual machine to the secondary virtual machine, which can take minutes to perform, thus also resulting in client data access disruption, application timeouts for applications relying on access to the data, client data loss, and violations of RTOs and RPOs.

Accordingly, as provided herein, a load balancer of the cloud computing environment is configured to preserve the IP address (a fronted IP address) used by the client to mount and access a data share of an aggregate of storage provided by the primary virtual machine to the client. The load balancer preserves the IP address during switchover from the primary virtual machine to the secondary virtual machine in response to the primary virtual machine failing. This allows for the switchover to be performed within seconds so that there is little to no client disruption and downtime because the clients can still use the same IP address for accessing client data within the aggregate through the secondary virtual machine. This is accomplished by utilizing a floating IP address option of the load balancer for routing requests to backend addresses of the virtual machines while retaining a frontend address of the requests as a request destination corresponding to the aggregate maintained by the virtual machines.

In an example, the client may include a frontend IP address within a request transmitted to the cloud computing environment. The frontend IP address may correspond to the data share of the aggregate provided by the primary virtual machine to the client. The load balancer may intercept the request, and utilize load balancer rules and/or logical interface management to determine that the request should be routed to a backend address of the primary virtual machine when the primary virtual machine is operational. In this way, the load balancer routes the request to the backend address, while the request retains the frontend address as the request destination. Once the primary virtual machine receives the request, the primary virtual machine utilizes the frontend address to process the request using the data share of the aggregate.

If the primary virtual machine fails, then a switchover is performed where the secondary virtual machine takes over ownership of the aggregate that will retain the frontend address used by the client to access the data share of the aggregate. When a subsequent request having the frontend address is intercepted by the load balancer, the load balancer utilizes the load balancer rules and/or the logical interface management to determine that the subsequent request should be routed to a second backend address of the secondary virtual machine that has taken over for the failed primary virtual machine. In this way, the load balancer routes the subsequent request to the second backend address, while the subsequent request retains the frontend address as the request destination. Once the secondary virtual machine receives the subsequent request, the secondary virtual machine utilizes the frontend address to process the subsequent request using the data share of the aggregate that has been migrated from the failed primary virtual machine to the secondary virtual machine. Because the same frontend address can be used by the client to access the data share of the aggregate, the switchover can be performed within seconds.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be create by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138.

During synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SMVs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements, which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
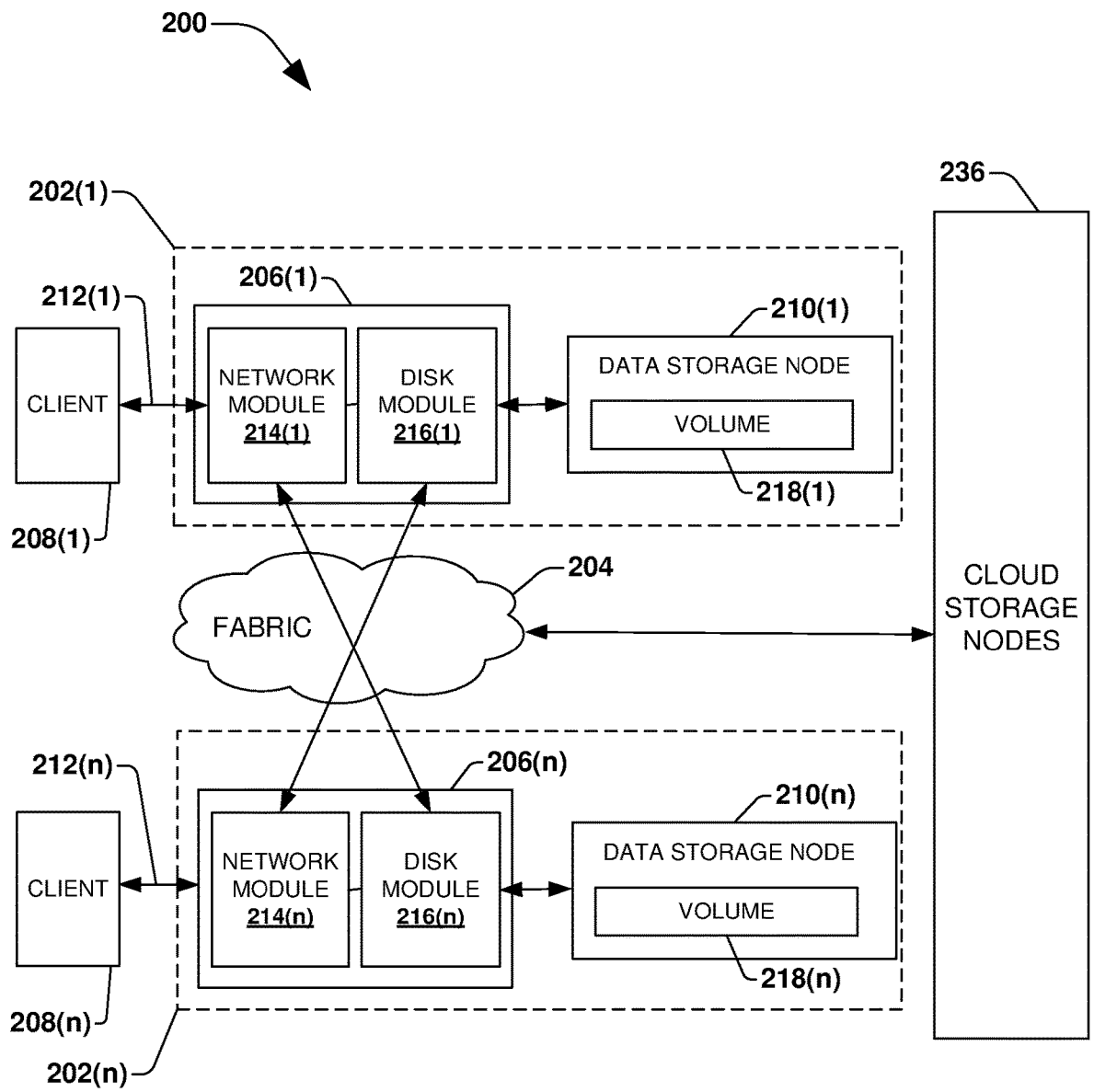
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236. The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n). The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(2), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(2) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
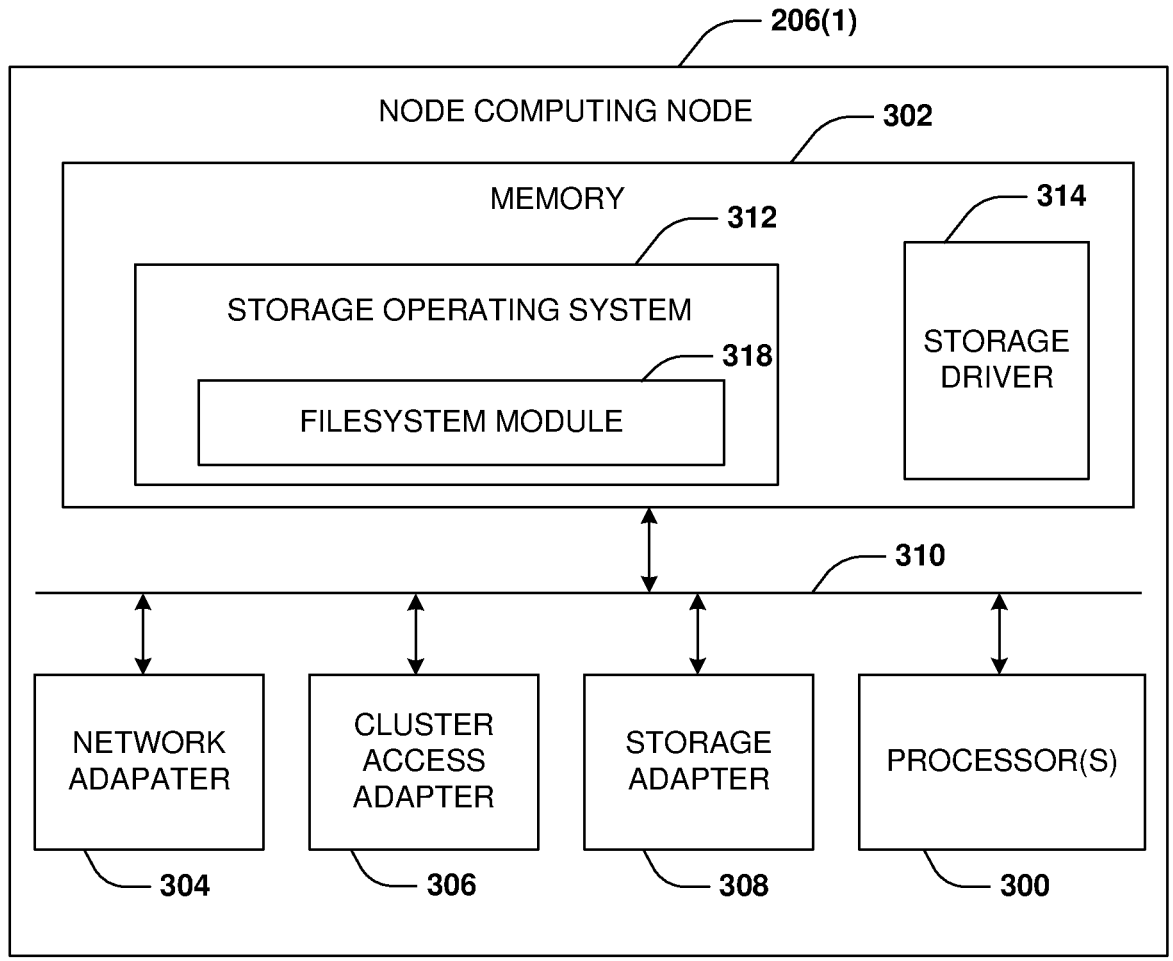
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
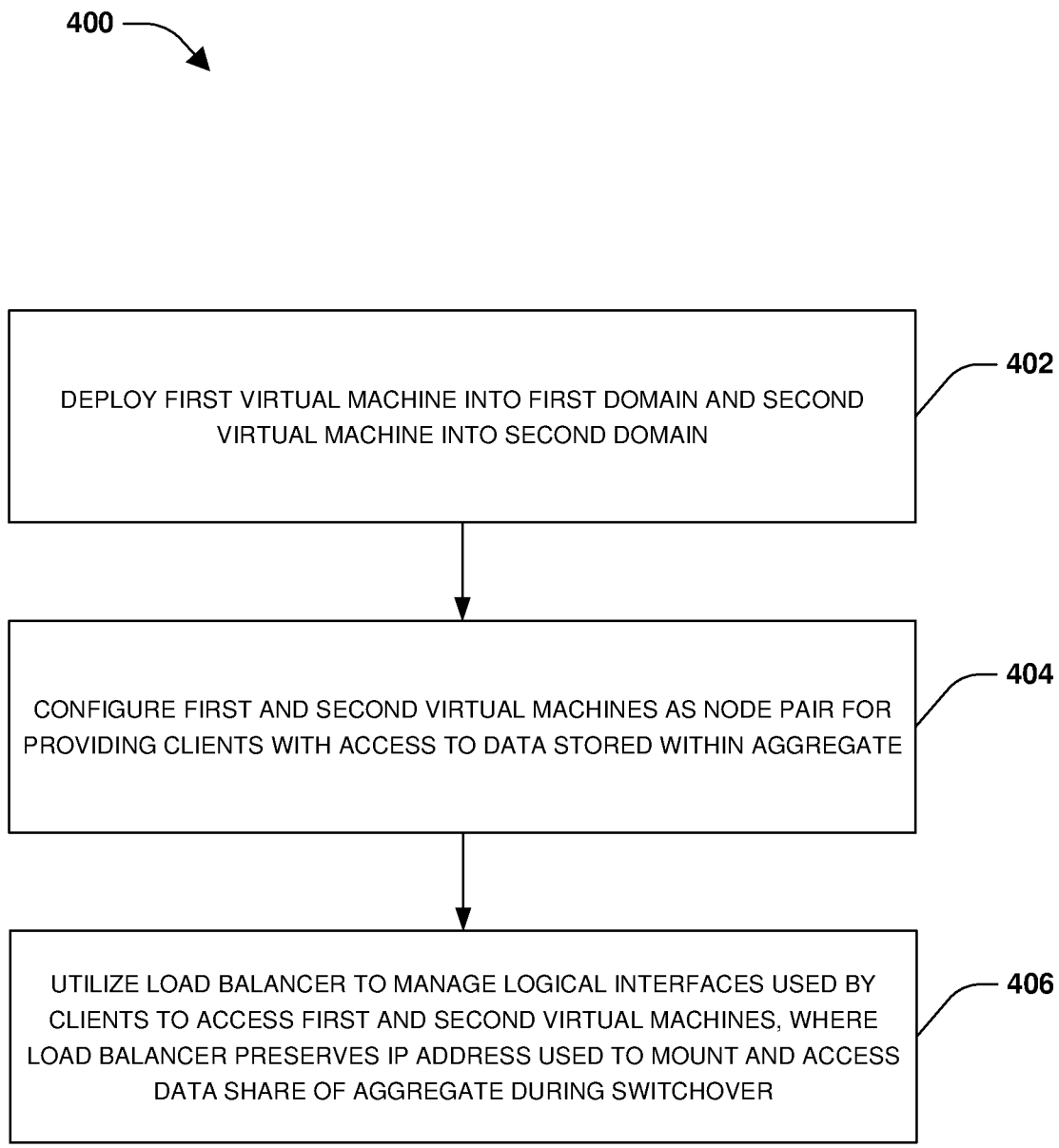
FIG. 4 is a flow chart illustrating an example method for address preservation during switchover.
Figure 5A:
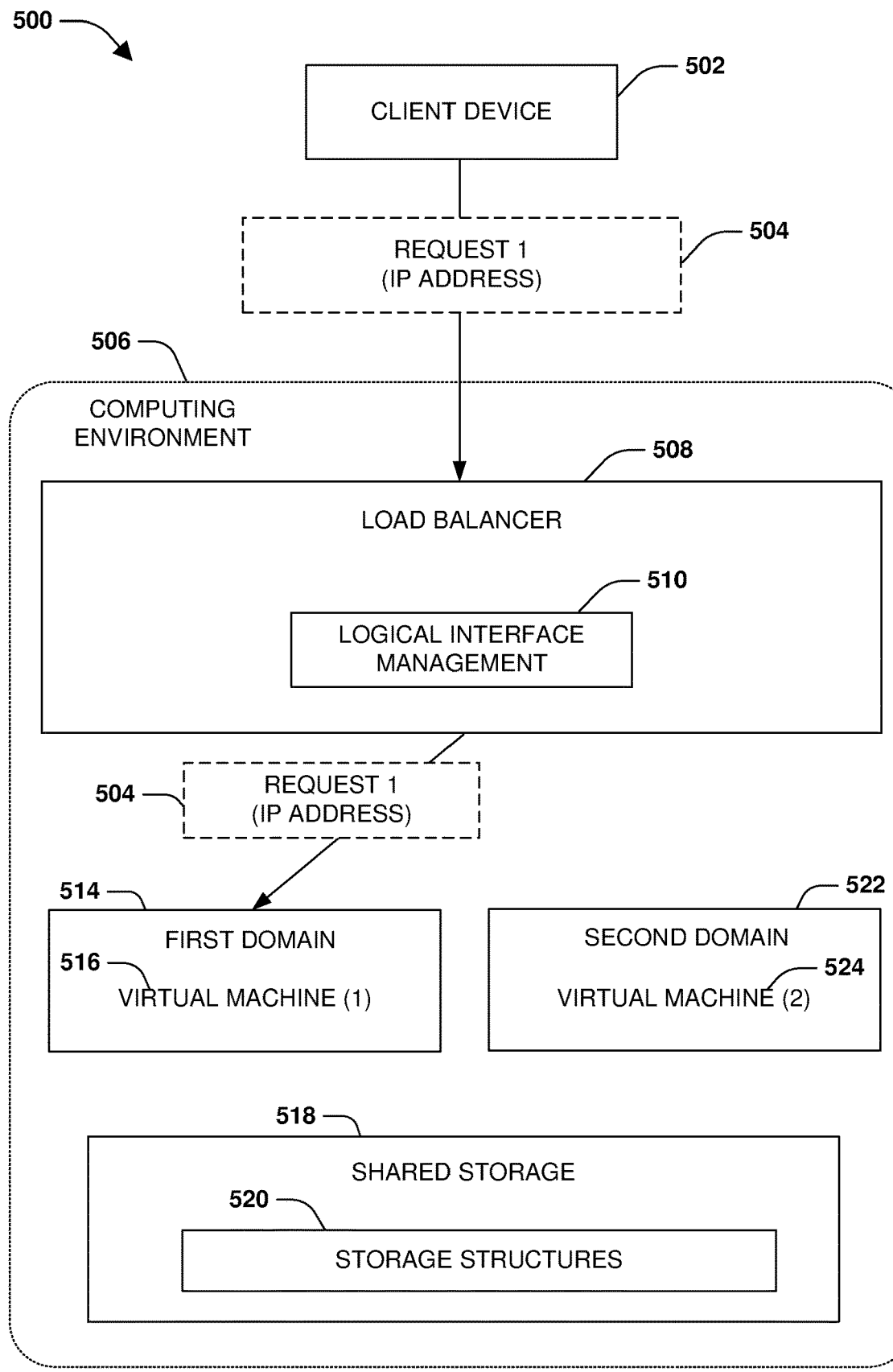
FIG. 5A is a block diagram illustrating an example system for address preservation during switchover, wherein a first virtual machine is servicing requests from client devices.
Figure 5B:
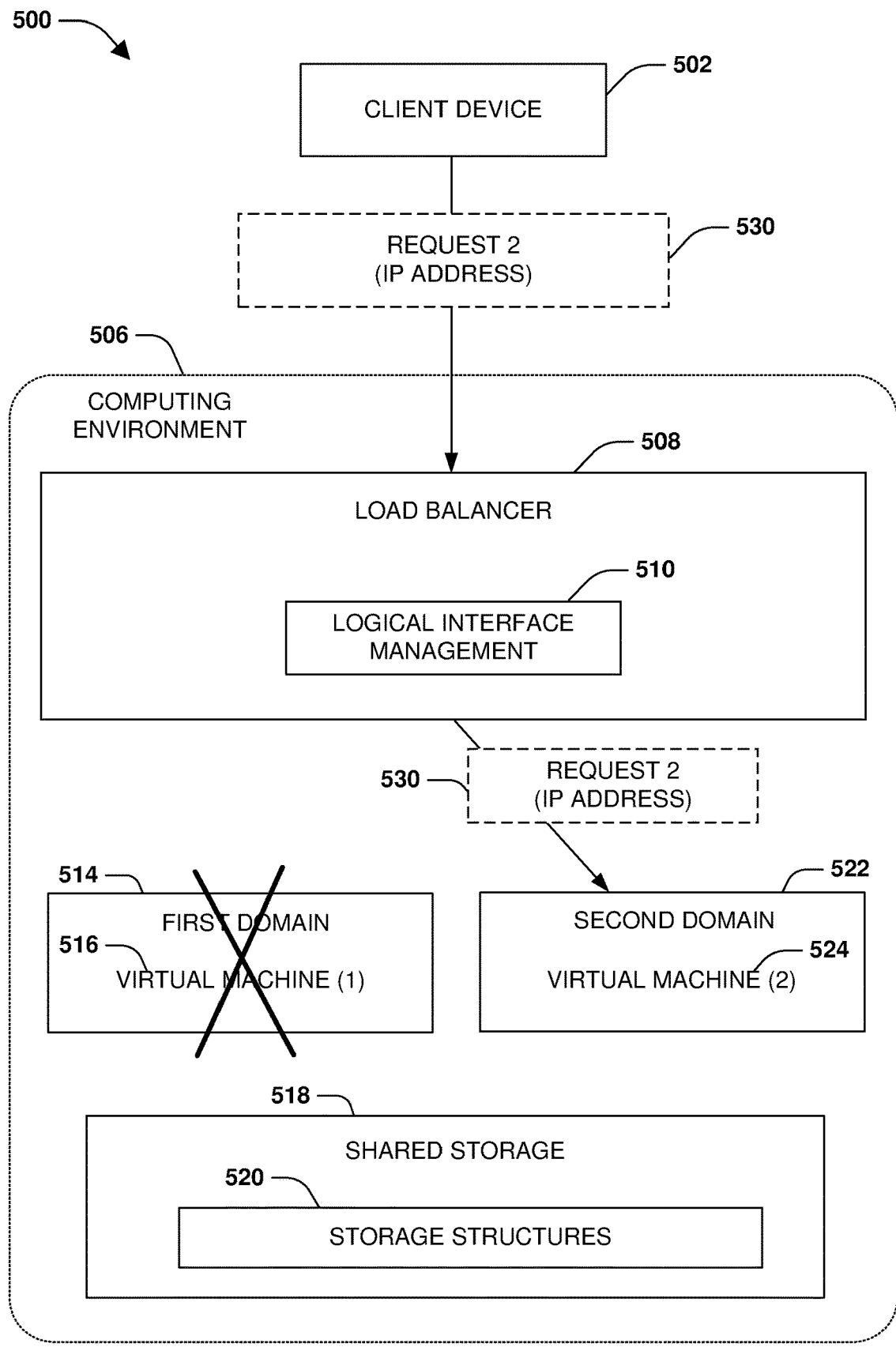
FIG. 5B is a block diagram illustrating an example system for address preservation during switchover, wherein a second virtual machine performs a switchover from a failed first virtual machine.
Figure 5C:
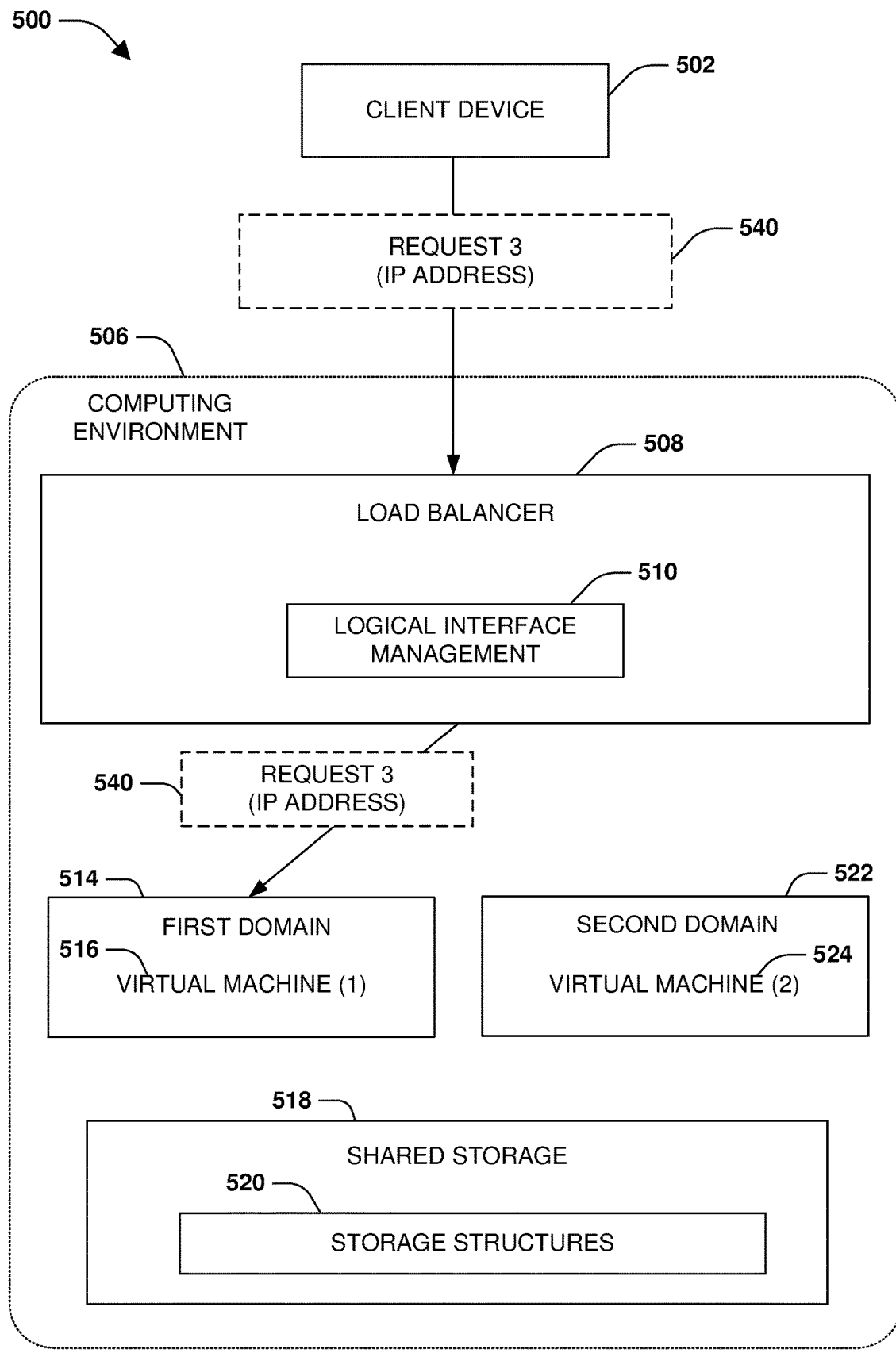
FIG. 5C is a block diagram illustrating an example system for address preservation during switchover, wherein a second virtual machine performs a giveback to a first virtual machine that has recovered from a failure.

One embodiment of address preservation during switchover is illustrated by an exemplary method 400 of FIG. 4 and further described in conjunction with system 500 of FIGS. 5A-5C. A computing environment 506, such as a cloud computing environment or any other environment within which virtual machines and applications can be hosted, may be configured to host virtual machines that store data within shared storage 518 of the computing environment 506, as illustrated by FIG. 5A. The virtual machines may create storage structures, such as public cloud disks, objects, page blogs, etc., within the shared storage 518 in order to store data within the storage structures.

At 402, a service provider may deploy a first virtual machine 516 into a first domain 514 of the computing environment 506 and a second virtual machine 524 into a second domain 522 of the computing environment 506. In an example, first domain 514 and the second domain 522 may comprise fault and update domains within the computing environment 506. For example, the first virtual machine 516 and the second virtual machine 524 may be placed into an availably set of the computing environment 506. Because the first virtual machine 516 and the second virtual machine 524 are in the same availability set, the computing environment 506 may host each virtual machine on a different node (a different set of hardware) so that a network or power failure may merely affect just one of the virtual machines. This is accomplished by placing the first virtual machine 516 into a first fault and update domain of the computing environment 506 and the second virtual machine 524 into a second fault and update domain, different than the first fault and update domain, of the computing environment 506. Furthermore, virtual machines within different fault and update domains may be updated at different times in order to protect applications and data from a failure.

The first virtual machine 516 may be allocated a first persistent boot disk. The first persistent boot disk may comprise one or more partitions. The one or more partitions may be used for a first non-volatile random access memory (NVRAM) within which operations are logged into an NVLOG as NVLOG data and a first core dump within which content of memory of the first virtual machine 516 can be stored/dumped. The second virtual machine 524 may be allocated a second persistent boot disk. The second persistent boot disk may comprise one or more partitions. The one or more partitions may be used for a second non-volatile random access memory (NVRAM) within which operations are logged into an NVLOG as NVLOG data and a second core dump within which content of memory of the second virtual machine 524 can be stored/dumped.

At 404, the first virtual machine 516 and the second virtual machine 524 are configured as a node pair for providing clients with non-disruptive access to data stored within an aggregate comprising one or more storage structures 520 within the shared storage 518 of the computing environment 506. For example, the first virtual machine 516 and the second virtual machine 524 may be configured as partners within the availability set. If one of the virtual machines fails and is unable to service client requests, then the surviving virtual machine can performed a switchover to take ownership of the aggregate and the one or more storage structures 520 so that the surviving virtual machines can now service the client requests having a same frontend address that was previously used by the clients to direct the requests to the aggregate. In an example, a storage structure may comprise a public cloud disk, an object, a page blob, or other storage structure supported by the computing environment 506 for storage within the shared storage 518.

Because the first virtual machine 516 may service requests from clients and the second virtual machine 524 may standby ready to take over for the first virtual machine 516 if the first virtual machine 516 fails, both the first virtual machine 516 and the second virtual machine 524 should have access to the one or more storage structures 520. However, only a single virtual machine should have write access to the one or more storage structures 520 at any point in time. Accordingly, a fence/lease/reservation mechanism is used to provide merely a single virtual machine with exclusive write access to the one or more storage structures 520, while other virtual machines may have merely read access to the one or more storage structures 520. For example, a SCSI reservation command issued by the first virtual machine 516 (e.g., the first virtual machine 516 may be configured to use a SCSI protocol to access storage) may be translated into a lease command (e.g., the computing environment 506 may not support the SCSI protocol but instead supports lease commands) used to place a lease on the one or more storage structures 520. In this way, data corruption can be mitigated where a virtual machine could otherwise modify data within the one or more storage structures 520 that is known to another virtual machine.

In an example, a storage structure may be accessible to the first virtual machine 516 and the second virtual machine 524 through a representational state transfer (REST) API and/or a SCSI API for shared access by the first virtual machine 516 and the second virtual machine 524.

In an example, the first virtual machine 516 and the second virtual machine 524 may be capable of communicating with one another over an network interconnect within the computing environment 506 between the first virtual machine 516 and the second virtual machine 524. For example, the first virtual machine 516 may transmit heartbeat information over an interconnect to the second virtual machine 524. In this way, the second virtual machine 524 can determine that the first virtual machine 516 has failed if there is a loss of the heartbeat. However, the heartbeat could be lost based upon an intermittent network failure of the interconnect where the first virtual machine 516 is operational and still servicing requests from client devices, and thus the second virtual machine 524 should not perform a switchover. Accordingly, the first virtual machine 516 may store the heartbeat information within a primary mailbox corresponding to a disk on a root aggregate (e.g., the heartbeat information is stored within the shared storage 518 of the computing environment or other storage location that can be read by the second virtual machine 524). In this way, the second virtual machine 524 can use the additional heartbeat information within the primary mailbox to determine whether the first virtual machine 516 has actually failed or whether the loss of the heartbeat information over the interconnect is merely due to a network issue.

Because the first virtual machine 516 may log some operations within an NVLOG stored within an NVRAM of the first virtual machine 516 (e.g., operations not yet committed/flushed to the one or more storage structures 520 within the shared storage 518), the first virtual machine 516 may mirror NVLOG data from the NVLOG over the interconnect to the second virtual machine 524. In this way, if the second virtual machine 524 takes over for the first virtual machine 516, the logged operations within the NVLOG data are accessible to the second virtual machine 524 and are not lost, which would otherwise cause client data loss and data corruption.

The computing environment 506 comprises a load balancer 508. The load balancer 508 is configured to intercept requests sent by client devices to services/applications/storage hosted by virtual machines within the computing environment 506. The load balancer 508 may be configured to manage 510 logical interfaces used by client devices to access the first virtual machine 516, the second virtual machine 524, and/or other virtual machines hosted within the computing environment 506, at 406. For example, a client device 502 may transmit a first request 504 to the computing environment 506 to access a data share of an aggregate of storage provided by the first virtual machine 516 to the client device 502. The client device 502 may include a frontend IP address within the first request 504. The frontend IP address may have been used by the client device 502 to mount and access the data share of the aggregate provided by the first virtual machine 516.

The load balancer 508 may utilize load balancer rules and/or logical interfaces to determine that the first request 504 should be routed to a first backend address of the first virtual machine 516 for processing of the first request. In this way, the load balancer 508 routes the first request 504 through the computing environment 506 to the first backend address of the first virtual machine 516. Because the first request 504 still comprises the frontend IP address (e.g., because the load balancer 508 is utilizing a floating IP address scheme), the first virtual machine 516 will direct/execute the first request 504 upon the one or more storage structures 520 used to store the aggregate exposed through the data share targeted by the first request 504.

FIG. 5B illustrates the second virtual machine 524 determining that the first virtual machine 516 has failed. For example, the second virtual machine 524 may fail to receive heartbeat information from the first virtual machine 516 over the interconnect for a threshold amount of time and/or may have determined that the first virtual machine 516 has not written the heartbeat information to the primary mailbox for a threshold timespan. Accordingly, the second virtual machine 524 performs a switchover to take over the servicing of requests from client devices targeting the data share of the aggregate comprising the one or more storage structures 520 within the shared storage 518 of the computing environment 506.

As part of the switchover, the second virtual machine 524 obtains a SCSI reservation on a mailbox disk of the first virtual machine 516. The second virtual machine 524 assimilates disks of the first virtual machine 516 as part of the switchover. For example, the second virtual machine 524 takes ownership of the one or more storage structures 520, and obtains reservations (leases) on the one or more storage structures 520 for exclusive write access to the one or more storage structures 520. In this way, any pending (in-flight) write operations from the first virtual machine 516 will fail to execute against the one or more storage structures 520, thus mitigating any data corruption that could occur from the first virtual machine 516 modifying the one or more storage structures 520 without the second virtual machine 524 having knowledge of such.

As part of the switchover, the second virtual machine 524 replays the NVLOG data mirrored from the first virtual machine 516 to the second virtual machine 524 so that operations logged within the NVLOG data but not yet stored (flushed) to the shared storage 518 is not lost. The second virtual machine 524 may initialize a logical interface of the first virtual machine 516 on a port of the second virtual machine 524. The logical interface may correspond to the frontend IP address used by the client device 502 to mount and access the data share of the aggregate stored within the one or more storage structures 520 of the shared storage 518 of the computing environment 506. As part of the switchover, the second virtual machine 524 listens to the port for client access requests, such as a second request 530 from the client device 502.

As part of the switchover, the load balancer 508 utilizes load balancer rules (e.g., rules that utilize a mapping of frontend addresses to backend addresses of virtual machines to which requests having the frontend addresses should be routed based upon current operational states of virtual machines) and/or logical interface management 510 to redirect requests having the frontend IP address to the second backend address of the second virtual machine 524 instead of to the first backend address of the first virtual machine 516. Because the load balancer 508 utilizes a floating IP address configuration, requests routed to the second virtual machine 524 through the computing environment 506 using the second backend address will still retain the same frontend IP address as a destination address of the requests. Retaining the use of the same frontend IP address significantly reduces the time for switchover and any potential client data access disruption. In this way, the load balancer 508 preserves the fronted IP address used to mount and access the data share of the aggregate previously provided by the first virtual machine 516 and now accessible through the second virtual machine 524.

In an example of switchover operation, the client device 502 transmits a second request 530 with the frontend IP address. The load balancer 508 intercepts the second request 530, and utilizes load balancer rules and logical interface management 510 to determine that the frontend IP address should be routed to the second backend address of the second virtual machine 524 while retaining the frontend IP address as a routing destination of the second request 530. Thus, the load balancer 508 routes the second request 530 through the computing environment 506 to the second backend address of the second virtual machine 524. The second virtual machine 524 processes the second request 530 utilizing the data share of the aggregate whose data is store within the one or more storage structures 520, of the shared storage 518 of the computing environment 506, whose ownership has now been taken over by the second virtual machine 524.

FIG. 5C illustrates the first virtual machine 516 recovering, and the second virtual machine 524 performing a giveback to the first virtual machine 516 so that the first virtual machine 516 can return to servicing requests from clients for the data share of the aggregate stored within the one or more storage structures 520. The second virtual machine 524 may determine that the first virtual machine 516 has recovered based upon identifying new heartbeat information from the first virtual machine 516. The second virtual machine 524 may communicate a takeover state to the first virtual machine 516. The takeover state may be communicated over a mailbox and/or over the interconnect of the computing environment 506 between the first virtual machine 516 and the second virtual machine 524.

During the giveback, the second virtual machine 524 may release the SCSI reservation (lease or fence) granting the second virtual machine 524 exclusive write access to the disks (e.g., a lease on the one or more storage structures 520). In this way, the first virtual machine 516 can regain control and exclusive write access to the disks corresponding to the one or more storage structures 520. The second virtual machine 524 returns the logical interfaces back to the first virtual machine 516, and the load balancer 508 updates the load balancer rules and the logical interface management 510 so that requests with the frontend IP address will now be routed to the first backend address of the first virtual machine 516 instead of being routed during switchover to the second backend address of the second virtual machine 524 by the load balancer 508. For example, the load balancer 508 will route a third request 540, from the client device 502 and specifying the frontend IP address, to the first backend address of the first virtual machine 516 for processing the third request 540 using the data share of the aggregate based upon the third request 540 maintaining the frontend IP address. In this way, the load balancer 508 redirects client reconnecting to the first virtual machine 516 to the first virtual machine 516 through the logical interfaces.

Figure 6:
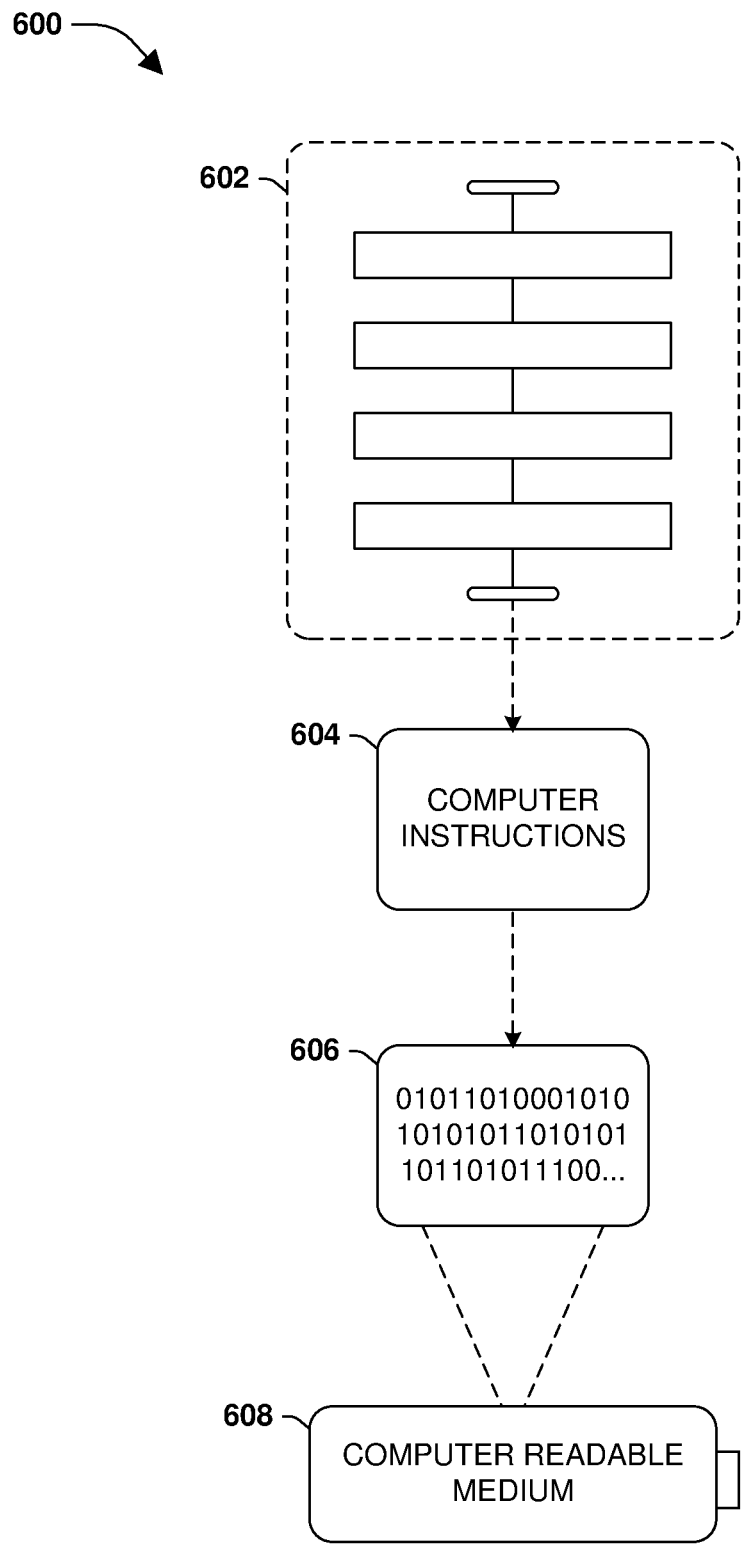
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable computer instructions 604 are configured to implement a system, such as at least some of the exemplary system 500 of FIGS. 5A-5C, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   initializing a logical interface of a primary virtual machine on a port of a secondary virtual machine;
   configuring the secondary virtual machine to listen to the port for client access requests
   intercepting, by a load balancer, a request that includes a frontend address corresponding to a data shared of an aggregate provided by the primary virtual machine to a client;
   utilizing, by the load balancer, logical interface management to determine that the request is to be routed to a first backend address of the primary virtual machine when the primary virtual machine is operational; and
   utilizing, by the load balancer, a floating IP address option to route the request to the first backend address as a routed request that retains the frontend address as a request destination corresponding to the aggregate maintained by the primary virtual machine.

2. The method of claim 1, comprising:
   hosting the primary virtual machine within a first domain;
   hosting the secondary virtual machine within a second domain; and
   selectively routing, by the load balancer, requests to the first domain or the second domain.

3. The method of claim 1, comprising:
   hosting the primary virtual machine within a first fault domain;
   hosting the secondary virtual machine within a second fault domain; and
   selectively routing, by the load balancer, requests to the first fault domain or the second fault domain.

4. The method of claim 1, comprising:
   hosting the primary virtual machine within a first update domain;
   hosting the secondary virtual machine within a second update domain; and
   selectively routing, by the load balancer, requests to the first update domain or the second update domain.

5. The method of claim 1, comprising:
   selectively applying an update to a first set of virtual machines hosted within a first update domain or a second set of virtual machines hosted within a second update domain, wherein the update is applied to the primary virtual machine.

6. A method, comprising:
   allocating a persistent boot disk to a primary virtual machine;
   partitioning the persistent boot disk into a set of partitions, wherein a partition is used as a non-volatile random access memory within which operations are logged into a log;
   intercepting, by a load balancer, a request that includes a frontend address corresponding to a data shared of an aggregate provided by the primary virtual machine to a client;
   utilizing, by the load balancer, logical interface management to determine that the request is to be routed to a first backend address of the primary virtual machine when the primary virtual machine is operational; and
   utilizing, by the load balancer, a floating IP address option to route the request to the first backend address as a routed request that retains the frontend address as a request destination corresponding to the aggregate maintained by the primary virtual machine.

7. A method, comprising:
   allocating a persistent boot disk to a primary virtual machine;
   partitioning the persistent boot disk into a set of partitions, wherein a partition is used as a core dump within which content of memory of the primary virtual machine can be stored
   intercepting, by a load balancer, a request that includes a frontend address corresponding to a data shared of an aggregate provided by the primary virtual machine to a client;
   utilizing, by the load balancer, logical interface management to determine that the request is to be routed to a first backend address of the primary virtual machine when the primary virtual machine is operational; and
   utilizing, by the load balancer, a floating IP address option to route the request to the first backend address as a routed request that retains the frontend address as a request destination corresponding to the aggregate maintained by the primary virtual machine.

8. The method of claim 1, wherein the routed request is routed to the primary virtual machine based upon the first backend address, and wherein the method comprises:
   processing, by the primary virtual machine using the frontend address as the request destination, the routed request using the data share of the aggregate.

9. The method of claim 1, comprising:
   in response to the primary virtual machine failing, performing a switchover operation for the secondary virtual machine to take ownership of the aggregate, wherein the secondary virtual machine retains the frontend address used by the client to access the data share of the aggregate.

10. The method of claim 1, comprising:
    in response to the primary virtual machine failing, performing a switchover operation for the secondary virtual machine to take ownership of the aggregate, wherein the secondary virtual machine retains the frontend address used by the client to access the data share of the aggregate; and
    routing, by the load balancer, an incoming request targeting the aggregate to a second backend address of the secondary virtual machine as a routed incoming request that retains the frontend address that was included in the incoming request.

11. The method of claim 1, comprising:
    in response to the primary virtual machine failing, performing a switchover operation for the secondary virtual machine to take ownership of the aggregate, wherein the secondary virtual machine retains the frontend address used by the client to access the data share of the aggregate;
    routing, by the load balancer, an incoming request targeting the aggregate to a second backend address of the secondary virtual machine as a routed incoming request that retains the frontend address that was included in the incoming request; and
    processing, by the secondary virtual machine using the frontend address, the routed incoming request using the data share of the aggregate.

12. A non-transitory machine readable medium comprising instructions for performing a method, which when executed by a machine, causes the machine to:
    initialize a logical interface of a primary virtual machine on a port of a secondary virtual machine;
    configure the secondary virtual machine to listen to the port for client access requests;

intercept, by a load balancer, a request that includes a frontend address corresponding to a data shared of an aggregate provided by the primary virtual machine to a client;

utilize, by the load balancer, logical interface management to determine that the request is to be routed to a first backend address of the primary virtual machine when the primary virtual machine is operational; and utilize, by the load balancer, a floating IP address option to route the request to the first backend address as a routed request that retains the frontend address as a request destination corresponding to the aggregate maintained by the primary virtual machine.

13. The non-transitory machine readable medium of claim 12, wherein the instructions cause the machine to:

host the primary virtual machine within a first domain;
host the secondary virtual machine within a second domain; and
selectively route, by the load balancer, requests to the first domain or the second domain.

14. The non-transitory machine readable medium of claim 12, wherein the instructions cause the machine to:

in response to the primary virtual machine failing, perform a switchover operation for the secondary virtual machine to take ownership of the aggregate, wherein the secondary virtual machine retains the frontend address used by the client to access the data share of the aggregate;
route, by the load balancer, an incoming request targeting the aggregate to a second backend address of the secondary virtual machine as a routed incoming request that retains the frontend address that was included in the incoming request;
process, by the secondary virtual machine using the frontend address, the routed incoming request using the data share of the aggregate.

15. The non-transitory machine readable medium of claim 12, wherein the instructions cause the machine to:

host the primary virtual machine within a first fault domain;
host the secondary virtual machine within a second fault domain; and
selectively route, by the load balancer, requests to the first fault domain or the second fault domain.

16. The non-transitory machine readable medium of claim 12, wherein the instructions cause the machine to:

host the primary virtual machine within a first update domain;
host the secondary virtual machine within a second update domain; and
selectively route, by the load balancer, requests to the first update domain or the second update domain.

17. The non-transitory machine readable medium of claim 12, wherein the instructions cause the machine to:

selectively apply an update to a first set of virtual machines hosted within a first update domain or a second set of virtual machines hosted within a second update domain, wherein the update is applied to the primary virtual machine.

18. A computing device, comprising:
a memory comprising instructions; and
a processor coupled to the memory, the processor configured to execute the instructions to cause the processor to:

initialize a logical interface of a primary virtual machine on a port of a secondary virtual machine;
configure the secondary virtual machine to listen to the port for client access requests;
intercept, by a load balancer, a request that includes a frontend address corresponding to a data shared of an aggregate provided by the primary virtual machine to a client;
utilize, by the load balancer, logical interface management to determine that the request is to be routed to a first backend address of the primary virtual machine when the primary virtual machine is operational; and
utilize, by the load balancer, a floating IP address option to route the request to the first backend address as a routed request that retains the frontend address as a request destination corresponding to the aggregate maintained by the primary virtual machine.

19. The computing device of claim 18, wherein the instructions cause the processor to:

host the primary virtual machine within a first domain;
host the secondary virtual machine within a second domain; and
selectively route, by the load balancer, requests to the first domain or the second domain.

20. The computing device of claim 18, wherein the instructions cause the processor to:

in response to the primary virtual machine failing, perform a switchover operation for the secondary virtual machine to take ownership of the aggregate, wherein the secondary virtual machine retains the frontend address used by the client to access the data share of the aggregate;
route, by the load balancer, an incoming request targeting the aggregate to a second backend address of the secondary virtual machine as a routed incoming request that retains the frontend address that was included in the incoming request;
process, by the secondary virtual machine using the frontend address, the routed incoming request using the data share of the aggregate.

21. The computing device of claim 18, wherein the instructions cause the processor to:

host the primary virtual machine within a first fault domain;
host the secondary virtual machine within a second fault domain; and
selectively route, by the load balancer, requests to the first fault domain or the second fault domain.

22. The computing device of claim 18, wherein the instructions cause the processor to:

host the primary virtual machine within a first update domain;
host the secondary virtual machine within a second update domain; and
selectively route, by the load balancer, requests to the first update domain or the second update domain.

23. The computing device of claim 18, wherein the instructions cause the processor to:

selectively apply an update to a first set of virtual machines hosted within a first update domain or a second set of virtual machines hosted within a second update domain, wherein the update is applied to the primary virtual machine.

* * * * *